United States Patent [19]

Korostenski

[11] 4,401,591

[45] Aug. 30, 1983

[54] TREATMENT OF ORGANIC ION EXCHANGE MATERIAL CONTAINING RADIOACTIVE WASTE PRODUCTS

[75] Inventor: Milan Korostenski, Västerås, Sweden

[73] Assignee: ASEA Aktiebolag, Västerås, Sweden

[21] Appl. No.: 229,117

[22] Filed: Jan. 28, 1981

[30] Foreign Application Priority Data

Jan. 31, 1980 [SE] Sweden ............................... 8000757

[51] Int. Cl.[3] ............................................... C01F 9/28

[52] U.S. Cl. .................................... 252/629; 252/631; 376/313; 423/7

[58] Field of Search ................ 210/670, 673; 252/626, 252/631; 376/313; 423/6, 7, 249

[56] References Cited

U.S. PATENT DOCUMENTS

| | | | |
|---|---|---|---|
| 3,434,809 | 3/1969 | Swanson | 423/7 |
| 3,669,631 | 6/1972 | Dietrich et al. | 252/631 |
| 4,118,317 | 10/1978 | Neeb et al. | 252/631 |
| 4,235,738 | 11/1980 | Knotik et al. | 252/626 |

FOREIGN PATENT DOCUMENTS

| | | | |
|---|---|---|---|
| 54-157000 | 12/1979 | Japan | 252/626 |

*Primary Examiner*—Leland A. Sebastian
*Attorney, Agent, or Firm*—Watson, Cole, Grindle & Watson

[57] ABSTRACT

An organic ion exchange material, which comprises a mixture of grains of a first type bearing groups containing exchangeable hydrogen ions and grains of a second type bearing groups containing exchangeable hydroxyl ions and which has been used in a cleaning circuit in a nuclear reactor, is subjected to a treatment before the ion exchange material is further processed for final storage of the radioactive waste products contained therein. The treatment comprises removing hydrogen ions and/or hydroxyl ions or groups containing hydrogen ions and/or groups containing hydroxyl ions from the grains, whereafter the grains of the first type are separated from the grains of the second type, before the grains of each type are further processed separately for final storage of the radioactive waste products contained therein.

10 Claims, No Drawings

TREATMENT OF ORGANIC ION EXCHANGE MATERIAL CONTAINING RADIOACTIVE WASTE PRODUCTS

TECHNICAL FIELD

This invention relates to a method for the treatment of an organic ion exchange material which contains radioactive waste products. In particular, but not exclusively, it relates to a method for the treatment of an organic ion exchange material which has been used in a cleaning circuit in a nuclear reactor plant.

BACKGROUND ART

In nuclear reactor plants ionic impurities are normally removed from the water in the primary circuit in the reactor by the use of ion exchange filters containing an organic ion exchange material. The water in the condensate cleaning circuit and in the discharge pipe is also normally subjected to purification in ion exchange filters of the same type. After being used for some time the ion exchange material becomes exhausted and must be taken care of and stored under safe conditions.

One known way of dealing with the ion exchange material, which is strongly hydrated, is to mix it with cement in storage containers, usually concrete moulds having a volume of a cubic meter, and to allow the cement to solidify. Another known way is to mix the ion exchange material, after drying, with bitumen and to store it in sheet-metal barrels. There are also different known ways of transferring or fixing the radioactive constituents into inorganic products, which are then finally stored.

The organic ion exchange material normally used consists of a mixture of grains bearing groups containing hydrogen ions (cationic grains) and grains bearing groups containing hydroxyl ions (anionic grains). After the material has been used, some of these groups still remain, namely those which have not been consumed during the use. This results in the grains of the two types in the material used being attracted to each other and being incapable of separation using reasonable efforts, if that should be desired.

DISCLOSURE OF THE INVENTION

The present invention is based on the realization that very great advantages may be gained if the grains of the two types are separated from each other and further processed separately for final storage. Especially in those cases where the ion exchange material contains long-lived and strongly radioactive isotopes, such as strontium-90 and cesium-137, the latter are accumulated only in the cationic grains, whereas the radioactive isotopes which are accumulated in the anionic grains have a considerably shorter life and a considerably lower radioactivity. Because the anionic grains normally occupy a larger volume than the cationic grains in the mixed ion exchange material, and because the final storage of the radioactive isotopes in the latter grains requires more stringent measures, considerable savings are to be achieved with regard to materials and effort if the latter grains alone and not the ion exchange material in its entirety are subjected to such stringent measures. The invention enables these advantages to be achieved by first subjecting the ion exchange material to a treatment to eliminate or reduce the attractive forces between the cationic grains and the anionic grains and thereafter separating the two types of grains before each type is further processed separately for final storage.

According to the invention a method for the treatment of an organic ion exchange material which contains radioactive waste products and comprises a mixture of grains of a first type bearing groups containing exchangeable hydrogen ions and grains of a second type bearing groups containing exchangeable hydroxyl ions, comprises the steps of removing hydrogen ions and/or hydroxyl ions from the mixture of grains, thereafter separating the grains of the first type from the grains of the second type, and further processing the grains of each of said types separately for final storage of at least the radioactive waste products.

The ion exchange material is preferably a resin. Particularly suitable resins are copolymers of styrene and divinyl benzene, including on the one hand grains bearing strongly acidic groups, such as sulfonic acid groups, and on the other hand grains bearing strongly basic groups, such as quaternary ammonium groups. The ion exchanger has a polymer structure which is permeable to water and which is hydrated upon delivery.

The attractive forces between the cationic grains and the anionic grains in the ion exchange material used may be eliminated or reduced in various ways. One suitable way is to treat the ion exchange material with a substance capable of replacing hydrogen ions in the cationic grains with other ions and/or of replacing hydroxyl ions in the anionic grains with other ions. Examples of such substances are salts, such as the sulfates, chlorides, nitrates and acetates, of the alkali metals (for example sodium sulfate or sodium chloride), dissolved in water; acids, such as hydrochloric acid and sulfuric acid; and hydroxides, such as hydroxides of alkali metals, for example sodium hydroxide dissolved in water. If either hydrogen ions or hydroxyl ions, or both, are replaced with other ions to a sufficient degree, it becomes possible to separate the grains of the two types from each other.

Another suitable way of eliminating or reducing the attractive forces between the anionic and cationic grains is to heat the ion exchange material, normally to a temperature exceeding 100° C. At 130° C.–150° C. the period of treatment for optimum effect is 15 to 20 hours for the resins mentioned above; at lower temperatures the optimum period would be longer, and at higher temperatures the optimum period would be shorter. The effect of the heat treatment is that groups containing hydrogen ions or hydroxyl ions such as sulfonic acid groups and quaternary ammonium groups, are removed from the grains. If either or both of these groups are removed to a sufficient extent, it becomes possible to separate the grains of the two types from each other.

After the attractive forces have been eliminated or reduced, the grains of the two types may be separated by various separation methods. One separation method is to bring the ion exchange material into contact with a fluid which has a density which is between the densities of the grains of the two types. The grains of one type then sink to the bottom of the vessel used, whereas the grains of the other type accumulate at the surface. For example, when using an ion exchange material of the styrene-divinyl benzene type mentioned above, the cationic grains in an undried state have a density of about 1200 $kg/m^3$ and in the dried state have a density of about 1400 $kg/m^3$, whereas the anionic grains in an undried state have a density of about 1060 $kg/m^3$ and in the dried state have a density of about 970 $kg/m^3$. Examples of suitable separating fluids are dichloromethane and other chlorinated hydrocarbons, mixtures of such chlorinated hydrocarbons with ethanol, and mixtures of water and glycerol in various concentrations, as well as aqueous solutions of saccharose in various concentrations.

Examples of other possible methods of separating the grains are flotation, and in certain cases magnetic or electrodynamic separation.

DESCRIPTION OF PREFERRED EMBODIMENTS

The invention is illustrated by the following Examples.

EXAMPLE 1

A wet ion exchange material (containing approximately equal parts of dry substance and water) consisting of a styrene-divinyl benzene polymer containing a mixture of cationic grains with sulfonic acid groups and anionic grains with quarternary ammonium groups in a volume ratio of 1:1.5, which has been used in the primary circuit in a light water nuclear reactor, is treated with 100 kg $Na_2SO_4$ per $m^3$ of the ion exchange material. For this purpose a 10 percent (by weight) aqueous solution of the sodium sulfate is circulated repeatedly through a bed of the ion exchange material at room temperature which is thereafter washed with water. The attractive forces between the grains are thereby removed. The wet material is then brought into contact with a mixture of ethanol and dichloromethane having a density of 1150 $kg/m^3$ and is mixed and distributed therein, for example using a stirrer. When separation takes place in an ordinary stationary vessel the anionic grains rise to the surface of the liquid, whereas the cationic grains drop to the bottom of the vessel. The grains of the two types are then dealt with separately.

When separation takes place with the aid of a centrifuge, the anionic grains accumulate at the centre of the centrifugal vessel and the cationic grains accumulate at its periphery. As before, they are dealt with separately.

The separating liquid may be recovered from the separately treated grain types by distillation.

EXAMPLE 2

An ion exchange material of the same type as in Example 1 is heated to 130° C. to 150° C. for 15 to 20 hours. The attractive forces are thereby removed. The dry compound obtained is then contacted with dichloromethane and separated into anionic grains and cationic grains in the same manner as in Example 1. Recovery of the dichloromethane may also take place in the same manner as in Example 1.

For disposal of the anionic grains separated in Examples 1 and 2 they may then be mixed with bitumen or with cement, while supplying water if necessary before being finally stored as described above. These grains may instead be treated with chemicals and the radioactive substances be transferred to inorganic ion exchangers, for example zeolites, which may then be embedded in glass or in other resistant inorganic materials such as aluminum oxide. The organic constituents may also be burnt off and the remainder embedded in inorganic materials.

The cationic grains may be treated for final storage in the same way as described in the preceding paragraph. Especially in those cases where the grains contain long-lived isotopes, such as strontium-90 and cesium-137, it is desirable to use the methods described involving enclosure in inorganic materials for the final storage.

I claim:

1. A method for the treatment of an organic ion exchange material which contains radioactive waste products and comprises a mixture of grains of a first type bearing groups containing exchangeable hydrogen ions and grains of a second type bearing groups containing exchangeable hydroxyl ions, which method comprises the steps of (a) removing said ions from at least one of said first and second types of grains in said mixture of grains, (b) thereafter separating the grains of said first type from the grains of said second type, and (c) further processing the grains of each of said first and second types separately for final storage of at least said radioactive waste products.

2. A method according to claim 1, wherein in step (a) said organic ion exchange material is treated with a solution of a salt in order to replace the hydrogen ions in said first type of grains with another cation.

3. A method according to claim 1, wherein in step (a) said organic ion exchange material is treated with a solution of an acid to replace the hydroxyl ions in said second type of grains with another anion.

4. A method according to claim 1, wherein in step (a) said organic ion exchange material is treated with a solution of a hydroxide to replace the hydrogen ions in said first type of grains with another cation.

5. A method according to claim 1, wherein in step (a) the hydrogen ions are removed from the first type of grains by removing the groups containing the hydrogen ions.

6. A method according to claim 1, wherein in step (a) the hydroxyl ions are removed from the second type of grains by removing the groups containing hydroxyl ions.

7. A method according to claims 5 or 6, wherein in step (a) said ion-containing groups are removed by heating said organic ion exchange material.

8. A method according to claim 1, wherein in step (b) the grains of said first type are separated from the grains of said second type by bringing the organic ion exchange material into contact with a fluid which has a density between the density of the grains of said first type and the density of the grains of said second type.

9. A method according to claim 1, wherein prior to step (a) said organic ion exchange material is treated with a solution of a salt in order to replace the hydroxyl ions in said second type of grains with another anion.

10. A method according to claim 1, wherein prior to step (a) said organic ions exchange material is treated with a solution of a salt in order to replace the hydrogen ions in said first type of grains with another cation and the hydroxyl ions in said second type of grains with another anion.

* * * * *